3,733,294
MANUFACTURE OF SOLUTIONS AND DISPERSIONS OF POLYMERS IN ORGANIC LIQUIDS FROM A POLYMER LATEX

Robert W. Keown, Wilmington, Del., assignor to E. I. du Pont de Nemours and Company, Wilmington, Del.
No Drawing. Continuation-in-part of application Ser. No. 30,270, Apr. 20, 1970. This application Nov. 25, 1970, Ser. No. 92,950
Int. Cl. C08f 45/28, 47/20
U.S. Cl. 260—33.6 A                  9 Claims

ABSTRACT OF THE DISCLOSURE

Solutions and dispersions of polymers in organic liquids can be manufactured by (A) providing a polymer latex containing an anionic or cationic emulsifier, (B) providing a solution in a water-immiscible organic liquid of a transfer agent which is able to undergo an ion-exchange reaction with said emulsifier as defined in C below, (C) bringing the latex of A and the solution of B into contact with each other so that an ion-exchange reaction occurs between the transfer agent and the emulsifier to form a reaction product whose solubility is such that in a mixture of equal parts by weight of said organic liquid and water, about 90–100% by weight of the reaction product is dissolved in the organic liquid and about 0–10% by weight is dissolved in the water, and (D) removing the water from the composition. When the organic liquid used in (B) is a solvent for the polymer at ordinary temperatures, a polymer solution is obtained by the process.

CROSS REFERENCE TO RELATED APPLICATION

This is a continuation-in-part of my patent application Ser. No. 30,270 filed on Apr. 20, 1970, now abandoned.

BACKGROUND OF THE INVENTION

This invention relates to a process for the manufacture of solutions and dispersions of polymers in organic liquids.

It is known in the art that any one of numerous polymers can be prepared economically and safely by an emulsion polymerization process which provides a polymer latex containing an anionic or cationic emulsifier. The resulting aqueous dispersion of fine particles of water-insoluble polymer is known to be useful in many applications, for example in preparing latex paints, adhesives, and the like.

However, it is often necessary or desirable to provide a coating composition, adhesive, or the like in which the polymer is present as a solution or dispersion in a suitable organic liquid. The utility of such compositions as polymer solutions, organosols, and plastisols is well known. But the known procedures for converting a latex to a solution or dispersion of the polymer in an organic liquid are not entirely satisfactory. For example, if the water is removed from the latex by means of a conventional heated evaporation apparatus, the resulting dried polymer in many cases will have one or both of the following drawbacks with respect to its use in preparing the solution or dispersion in an organic liquid: (1) too costly because of the expense of removing the water; (2) cannot be dissolved or dispersed properly in the organic liquid because of chemical or physical changes that took place in the polymer during the drying process.

Thus, the industries which manufacture polymeric coating compositions, adhesives, and other liquid polymeric compositions are in need of a beneficially useful process which enables one to employ a latex in the preparation of a solution or dispersion of a polymer in an organic liquid.

SUMMARY OF THE INVENTION

Expressed broadly, the present invention provides a process for preparing a composition comprised of a mixture of a substantially water-insoluble polymer and an organic liquid which comprises (A) Providing an aqueous dispersion of fine particles of said polymer containing an emulsifier selected from the group consisting of anionic and cationic surfactants, (B) Providing a solution of a transfer agent in an organic liquid which is substantially immiscible with water, said transfer agent being a compound having the ability to undergo an ion-exchange reaction as defined in C below, (C) Causing the transfer agent solution provided in B to come in contact with the aqueous dispersion provided in A so that said transfer agent undergoes an ion-exchange reaction with said emulsifier and thereby forms a reaction product whose solubility is such that in a mixture of equal parts by weight of said organic liquid and water, about 90–100% by weight of the reaction product is dissolved in the organic liquid and about 0–10% by weight in dissolved in the water, (D) Causing substantially all the water to be removed from the composition.

The invention also provides novel compositions obtained by the process described above.

DESCRIPTION OF PREFERRED EMBODIMENTS

In most of the preferred embodiments of the novel process, the amount of transfer agent solution used in Step C is such that it contains about 1.0–1.5 equivalents of transfer agent for each equivalent of anionic or cationic emulsifier present in the latex (aqueous dispersion). At the beginning of Step C, it is essential that the transfer agent be in solution in an organic liquid which is entirely or almost entirely immiscible with water.

The polymer particles in the latex are completely or almost completely insoluble in water; however, particles can be used which undergo some swelling in water. Known emulsion polymerization methods can be used to prepare the latex. The polymer of the latex can be any substantially water insoluble polymer which provides the desired properties in the end product; it is preferably a synthetic polymer which can be made by emulsion polymerization. The useful polymers include homopolymers and copolymers of chloroprene, butadiene, isoprene, vinyl chloride, vinyl acetate, styrene, acrylonitrile, alkyl acrylates, alkyl methacrylates and the like.

Some preferred embodiments employ a cationic surfactant as the emulsifier, and the transfer agent is a sulfonic acid, a carboxylic acid, a phosphoric acid, a suitable salt of one of these acids (e.g. an alkali metal salt or amine salt), or a blend of two or more such transfer agents.

Other preferred embodiments employ an anionc surfactant as the emulsifier, and the transfer agent is a quaternary ammonium salt, a primary-, secondary- or tertiary amine, or a blend of two or more such transfer agents. Among the useful transfer agents of this type are methyltricaprylyl ammonium chloride, laurylamine, myristylamine, oleylamine, dilauryl dimethyl ammonium chloride, dicocodimethyl ammonium chloride (the coco being the alkyl groups such as $C_{12}$ to $C_{18}$ known to be present in the mixture of acids obtained by the hydrolysis of coconut oil, tricaprylylamine, n-dodecylamine, t-octylamine, di(2-ethylhexyl)amine, trioctylamine, and primary $C_{18}$ aliphatic amine.

When using an anionic emulsifier, it is preferred to select a transfer agent having greater solubility in the Step B organic liquid than in water. It is usually preferred to use a transfer agent whose solubility in water at 22 C. is less than 1% by weight. To avoid obtaining an emulsion of the organic liquid in water, the water solubility of the transfer agent under the conditions of the Step C reaction is preferably about 0–1% by weight. The reaction product formed in Step C normally lacks the ability to function as an emulsifier in the composition resulting from Step C.

Any suitable known mixing method can be used to bring the latex and the transfer agent solution in contact with each other. Step C can also be carried out by placing a layer of the latex and a layer of the transfer agent solution in a vessel so that one layer is in superposed contact with the other and allowing the reaction to take place with little or no initial mixing; however, the layers tend to become mixed as the reaction proceeds.

The Step C reaction takes place at a temperature within the range of ordinary room temperatures or slightly below to elevated temperatures that are not harmful to the ingredients of the composition. The solubility characteristics mentioned above for the reaction product formed in Step C are measured at the Step C reaction temperature and reaction product concentration.

Some of the most useful compositions are obtained by the novel process when the organic liquid used in Step B is a nonsolvent for at least a major portion of each particle of the polymer at a temperature at least as high as about 40° C., and Step C results in a composition in which fine particles of the polymer are dispersed in the organic liquid.

Other very useful compositions are obtained when the organic liquid used in Step B is a solvent for the polymer (e.g. at ordinary temperatures of about 15–30° C.), and Step C results in a composition in which the polymer is in solution in the organic liquid. One can also make a dispersion as mentioned in the previous paragraph, and then convert the dispersion to a solution after Step D by adding enough of a good solvent so that the polymer becomes soluble in the blended organic liquid. This procedure is useful, for example, when it is desired to use a water-miscible organic liquid in the end product solution which would be unsatisfactory for use in Steps B and C.

A suitable organic liquid for a particular application can readily be selected after it is decided (1) whether the product of Step D is to have the polymer present as a solution or as a dispersion; (2) whether or not the organic liquid is to be evaporated after applying the composition to a substrate; and (3) what temperature and time conditions will be practical for drying or fusing the composition on the substrate. Known procedures and tables can be used to consider solubility parameters and hydrogen bonding as an aid to the selection of organic liquids having the desired solubility or insolubility for the polymers to be used. For example, one can use the information given by E. P. Lieberman in The "Official Digest" of the Federation of Societies for Paint Technology, volume 34, No. 444, pages 30–50 (January 1962).

When using the present process to manufacture an organic liquid dispersion of fine polymer particles as the end product (e.g. organosols and the like), it is usually advisable to employ polymer particles composed of a block copolymer, a graft copolymer, or a blend thereof, with about 5–49% (preferably about 10–45%) by weight of each particle having at least some solubility in the organic liquid of the final composition. The portion of the particle having "some solubility" is soluble enough in the organic liquid so that the dispersion has the desired degree of stability for the application intended; this includes a degree of solubility within the range from completely soluble to only soluble enough to undergo an appreciable amount of swelling in the liquid. The soluble portion remains attached to the particle.

In an example of preparing the type of dispersion mentioned in the previous paragraph, the particles used in Steps A and C of the process are composed of a graft copolymer of about 51–95% by weight of chloroprene and about 49–5% by weight of 2-ethylhexylmethacrylate. An especially useful embodiment of this process comprises the use of methyltrioctyl ammonium chloride as the transfer agent (the latex surfactant being anionic) and hexane as the organic liquid. It is also an example of making the type of dispersion mentioned in the previous paragraph to use particles composed of (a) substantially spherical monomolecular particles of a polymer (e.g. a cross-linked polymer) which is rubbery at a temperature below 60° C. and having a molecular weight large enough to render the polymer substantially insoluble in the organic liquid, and (b) a polymer having at least some solubility in the organic liquid grafted onto component (a) at sites which had originally been pendent sites of free radical attack.

The novel process is also useful for the manufacture of other kinds of compositions, including plastisols. For example, the organic liquid used in Step B can be not only a nonsolvent for all or most of the polymer at temperatures of about 15–40° C., but also a solvent for all or most of the polymer at a temperature between about 41° C. and a higher temperature that is not harmful to the components of the completed composition. All or part of the organic liquid which functions as a solvent at temperatures upwards of 40° C. can be a substantially non-volatile liquid at the highest temperatures to which the end product will be exposed and adapted to function as a plasticizer for the polymer in the end product. A skilled plastisol chemist will have no difficulty in manufacturing useful compositions after reading the present disclosure.

Step D of the process (the removal of water), can be accomplished by any suitable known liquid separation method, for example by settling, decantation, use of separating funnel, using a centrifuge, or by combining two or more such methods. A centrifuge method is especially useful when the product of Step C has a relatively low organic liquid content, when the organic liquid or the aqueous phase is quite, viscous, or when it is important that absolutely no water remain in the product of Step D. The separation of components in Step D can also sometimes be facilitated by mixing a small amount of calcium chloride with the composition.

Additives known to be useful in the manufacture of polymeric adhesives, coating compositions and the like can be added to the compositions obtained by the novel process, for example, curing agents, tack-enhancing agents, drying oils, resins, coloring agents, fungicides, and stabilizers.

The process of the present invention has broad and beneficial utility in the manufacture of solutions and dispersions of water insoluble polymers in organic liquids. The resulting solutions and dispersions are especially useful in the formation of adhesives and protective and decorative coating compositions.

These polymeric solutions and dispersions can be made directly from latexes formed by emulsion polymerization or other suitable latex-forming methods.

The present process has important advantages over methods commonly used in the past for the preparation of a solution or dispersion of a polymer in an organic liquid from a latex. For example, this process eliminates the time, effort, and expense required to pass the latex through a heated evaporation apparatus until a dried polymer is obtained, and then to redisperse or dissolve the dried polymer in the organic liquid. Moreover, this process enables one to manufacture many organic liquid containing polymer compositions that are difficult or impossible to make by prior art methods which subject the polymer to conditions that cause it to undergo physical or chemical changes which lessen or destroy its ability to be dissolved or dispersed in the organic liquid. It is known that such changes will occur with many polymers when heating and drying the latex or when using heat or high-shear mixing in attempting to put the solid polymer into a suitable state of solution or dispersion in the organic liquid.

The examples which follow are given for the purpose of illustrating the invention. All quantities shown are on a weight basis unless otherwise indicated.

EXAMPLE 1

This example illustrates the use of the novel process for preparing a dispersion of fine polymer particles in an organic liquid which is a nonsolvent for a major portion of each of the particles at temperatures up to and above 40° C. The disperison (organosol) is useful in the formulation of adhesives and coatings which can easily be dried by evaporation of the organic liquid.

First, a chloroprene/acrylic graft copolymer latex is prepared by (1) dissolving two parts of triethanolamine dodecylbenzenesulfonate (anionic surfactant) in 133 parts of water; (2) vigorously mixing the resulting emulsifier solution with a monomer blend of 80 parts chloroprene and 20 parts 2-ethylhexylmethacrylate to form an aqueous emulsion of the monomers; (3) with the monomer emulsion in a conventional polymerization flask equipped with stirrer, thermometer, heater, addition funnel, and nitrogen inlet, adding a catalyst solution composed of 0.1 part sodium sulfite in 20 parts water; (4) heating the contents of the flask to a temperature of 40° C.; (5) gradually adding a catalyst solution composed of 0.27 part potassium persulfate in 6.7 parts water, and continuing to maintain a temperature of 40° C. in the flask until polymerization of the chloroprene is substantially complete; (6) heating the mixture briefly at 65° C.; (7) adding 1.35 parts of a short-stopping agent composed of an emulsion having the formula 30 parts water, 64.1 parts toluene, 2.9 parts sodium lauryl sulfate, 1 part phenothiazine, 1 part 4-tertiary butyl catechol, and 1 part sodium methylene bis naphthalene sulfonate. The resulting latex is an aqueous dispersion of fine particles of a graft copolymer of 80 parts chloroprene and 20 parts 2-ethylhexylmethacrylate, the emulsifier being the anionic surfactant of Step 1, and the polymer having grafted side chains of poly(2-ethylhexylmethacrylate).

The preparation of the organosol is completed by (a) making a transfer agent solution composed of 0.47 part of methyl trioctyl ammonium chloride (88% pure) dissolved in 47 parts of hexane; this can be done by mixing the two ingredients briefly at 25° C.; (b) mixing 100 parts of water with 100 parts of the latex described above; (c) putting the diluted latex of Step (b) and the transfer agent solution of Step (a), both at 24° C., into a closed bottle and shaking the bottle for five minutes to provide vigorous mixing of the contents, thereby causing the transfer agent to undergo an ion-exchange reaction with the anionic emulsifier to form a reaction product which, in the resulting composition, is about 100% dissolved in the hexane, is substantially insoluble in the water, and not able to function as an emulsifier; (d) allowing the contents of the bottle to settle for one hour and form a bottom layer composed mostly of water and a top layer of polymer particles dispersed in hexane; (e) mixing with the contents of the bottle 15 parts of a 1% aqueous solution of calcium chloride to cause an additional small amount of polymer particles to be transferred from the aqueous phase to the hexane phase; (f) pouring the mixture into a separatory funnel and again allowing the mixture to form two separate layers; and (g) draining off the water layer, the completed organosol remaining in the funnel.

The transfer agent used in Step (a), which can also be called methyl tricaprylyl ammonium chloride, has a water solubility of less than 5 parts per million at 30° C. In the ion-exchange reaction of Step (c), the dodecylbenzenesulfonate anion of the latex emulsifier is replaced by the chloride anion of the transfer agent. A minor portion of each of the polymer particles transferred from the aqueous phase is soluble in hexane, and remains as part of the particle. Thus, each particle has a portion that is "solvatable" in hexane. The polymer particles are composed of substantially spherical monomolecular particles of a rubbery polymer whose molecular weight is large enough so that it is substantially insoluble in the hexane, and solvatable poly(2-ethylhexylmethacrylate) grafted onto said spherical particles.

The resulting organosol is useful as is, or in combination with known additives, in adhesive and protective coating applications. It has a desirable combination of spraying, drying, and adhesion characteristics.

Useful organosols are also obtained when Example 1 is repeated except the hexane of the transfer agent solution is replaced with heptane, isoheptane, or a mixture of cyclohexane and hexane in a volume ratio of 40:60. Also, a portion of the volatile organic liquid can be replaced with a non-volatile organic liquid which is adapted to serve as a plasticizer for the polymer and which is a solvent for the polymer at a temperature between about 41° C. and a higher temperature that is not harmful to the components of the composition. For example, the plasticizer can be a light process oil derived from petroleum (Sun Oil Company Circo Light Process Oil, aniline point 71° C.); and the polymer can be provided with a lower molecular weight to give it sufficient solubility in the plasticizer by using a blend of 65 parts chloroprene and 35 parts 2-ethylhexylmethacrylate in Step 2 of Example 1, and dissolving therein 0.3 parts of dodecylmercaptan.

EXAMPLE 2

Another type of organic liquid dispersion of polymer particles is prepared in this example.

First, a chloroprene polymer latex is prepared by (1) dissolving 22.5 grams of laurylamine acetate (cationic surfactant) in 1000 grams of water; (2) adding with stirring 15.3 grams of ethylene glycol dimethacrylate, 1.61 grams of dodecylmercaptan and 750 grams of chloroprene and mixing to form an emulsion; (3) with the resulting chloroprene emulsion in a polymerization flask as described in Example 1, heating the mixture to 40° C. and adding 2 ml. of 2% aqueous potassium persulfate solution; (4) gradually adding more of the potassium persulfate solution at a rate of about 2 ml. every 15 minutes and continuing to maintain the mixture at 40° C. until polymerization occurs to 93% conversion as calculated from the 38.7% solids content; (5) removing the remaining monomer by means of a conventional steam-stripping apparatus. The resulting latex is an aqueous dispersion of high molecular weight cross-linked polychloroprene.

The preparation of the organic liquid dispersion is completed by (a) making a transfer agent solution composed of 2 grams dodecylbenzenesulfonic acid dissolved in a mixture of 82.4 grams of hexane and 33.4 grams of toluene, the solution being formed by briefly mixing the ingredients at 25° C.; (b) mixing 100 grams of water with 100 grams of the latex resulting from Step 5 above; (c) putting the diluted latex of Step (b) and the transfer agent solution of Step (a), both at 24° C., into a closed bottle and shaking the bottle for five minutes to mix the contents vigorously and cause the transfer agent to undergo an ion-exchange reaction with the cationic emulsifier, thus forming a reaction product which is substantially completely dissolved in the hexane/toluene mixture and substantially insoluble in the water, and not able to function as an emulsifier in the resulting composition; (d) allowing the contents of the bottle to settle and form a layer composed mostly of water beneath a layer of polymer particles dispersed in the organic liquid; and (e) by means of a separatory funnel, removing the aqueous layer. In the ion-exchange reaction of Step (c), the laurylammonium cation of the latex emulsifier is replaced by the hydrogen cation of the transfer agent. The polymer particles are swollen by the organic liquid but are not dissolved by it. The transfer agent used in Step (a) has greater solubility in water than in the hexane-toluene mixture; but the reaction product formed in Step (c) has a water solubility of less than 0.3% at 24° C.

The resulting dispersion is useful by itself or in combination with known additives as an adhesive or coating composition.

EXAMPLE 3

This example illustrates the preparation of another non-aqueous polymer dispersion having utility in adhesive and coating applications.

A chloroprene polymer latex is prepared by (1) dissolving in 2015 grams of water 11.3 grams of sodium hydroxide, 5.5 grams of sodium sulfite, 13.0 grams of sodium formaldehyde-naphthalenesulfonic acid condensate and 0.13 gram of sodium 2-anthraquinone-sulfonate; (2) adding with stirring to the resulting solution a mixture of 1800 grams of chloroprene, 38.0 grams of ethylene glycol dimethacrylate, 54.0 grams of disproportionated wood resin (as described below) and 3.88 grams of dodecylmercaptan, thereby forming a sodium salt of the wood resin which serves as an anionic surfactant, and mixing to form an emulsion; (3) with the resulting chloroprene emulsion in a polymerization flask as described in Example 1, heating the emulsion to 40° C. and adding 1 ml. of an aqueous catalyst solution of potassium persulfate (0.15%) and sodium 2-anthraquinone sulfonate (0.015%); (4) gradually adding 21 ml. more of the catalyst solution while maintaining the mixture at 40° C. until the composition has a specific gravity of 1.077; (5) keeping the composition at 45° C. until it has a specific gravity of 1.085 (93% conversion); (6) adding 74 grams of a short-stopping agent composed of an emulsion having the formula described in Step 7 of Example 1; and (7) removing monomer by means of a conventional steam-stripping apparatus from the resulting latex of high molecular weight cross-linked polychloroprene.

The wood resin used in Step 2 to form the anionic surfactant has an acid number of about 140, and each 100 parts by weight thereof contains about 55 parts of dehydroabietic acid, 20 parts of pimaric acid, 12 parts of tetrahydroabietic acid, 6 parts of dihydroabietic acid, 2 parts of fatty acids, 4 parts of other acids, and less than 1 part abietic acid. It is known in the art how to prepare disproportionated wood resin; for example, in U.S. Pats. 2,154,629 and 2,201,237.

The latex resulting from Step 7 is converted to a non-aqueous polymer dispersion by (a) making a transfer agent solution composed of 1.8 grams of methyl trioctyl ammonium chloride dissolved in a mixture of 99 grams of hexane and 40 grams of toluene; (b) mixing 100 grams of the latex with 100 grams of an aqueous solution of 0.4 gram of acetic acid and 0.08 gram of sodium methylene bis naphthalene sulfonate; (c) putting the diluted latex and the transfer agent solution, both at 24° C., into a closed bottle and shaking the bottle to mix the contents vigorously and cause the transfer agent to undergo an ion-exchange reaction with the anionic emulsifier, thus forming a reaction product which is substantially completely dissolved in the organic liquid and insoluble in the water, and not able to function as an emulsifier in the resulting composition; (d) allowing the contents of the bottle to settle and form a layer composed mostly of water beneath a layer of polymer particles dispersed in the organic liquid; and (e) by means of a separatory funnel, removing the aqueous layer.

If desired, a small additional amount of polymer can be transferred from the aqueous phase after Step (d) by mixing with the contents of the bottle a small amount of a dilute aqueous solution of a suitable coagulant for the polymer, for example, calcium chloride or sodium acetate.

EXAMPLE 4

In this example a latex is converted to a polymer solution which is useful in adhesive and coating applications.

A styrene:butadiene (50:50) copolymer latex is prepared by (1) dissolving 3.0 grams of potassium persulfate in 1800 grams of water; (2) adding with stirring to the resulting solution 40 grams of the potassium salt of the disproportionated wood resin described in Example 3 (anionic surfactant), 500 grams of butadiene, 500 grams of styrene, and 5 grams of dodecylmercaptan, and mixing to form an emulsion; (3) with the resulting monomer emulsion in a nitrogen-purged pressure-type polymerization flask, heating the emulsion to 50° C. while keeping it under autogenous pressure until polymerization occurs to 50% conversion as calculated from the solids content; (4) adding 1.0 gram of hydroquinone; (5) removing the remaining monomer and part of the water by means of a conventional rotary evaporator at about 25 mm. of mercury absolute pressure to provide a latex whose solids content is about 40%.

The latex is converted to an organic liquid solution by (a) making a transfer agent solution composed of 0.75 gram of methyl trioctyl ammonium chloride (88% pure, "Aliquat" 336 from General Mills, Inc.,) dissolved in 85 grams of heptane; (b) mixing 37.5 grams of the latex with 50 grams of water, and repeating Steps C, D, and E of Example 3 to perform the ion-exchange reaction and separation of layers. If desired, 20 grams of 10% aqueous calcium chloride solution can be added after Step C or Step D and the mixture agitated (e.g. by gently shaking the bottle for about one minute); after final settling and separation of layers, a small additional amount of polymer is thereby transferred from the aqueous phase to the organic liquid.

EXAMPLE 5

A polybutadiene latex is converted to an organic liquid solution having utility in adhesive and coating applications.

First, a polybutadiene latex is prepared by repeating Steps 1–5 of Example 4 except 1000 grams of butadiene replaces the monomers of Step 2, and in Step 5 the latex is evaporated to a solids content of about 59%.

Then the latex is converted to a solution of the polymer in heptane by repeating the conversion procedure described in Example 4 except 25.4 grams of the latex of Example 5 is used in Step B.

EXAMPLE 6

A styrene:butadiene (30:70) copolymer latex is converted to an organic liquid solution useful in the manufacture of adhesives and coating compositions.

First, a copolymer latex is prepared by repeating Steps 1–5 of Example 4 except Step 2 employs 700 grams of butadiene and 300 grams of styrene and the wood resin surfactant is replaced with 50 grams of potassium oleate.

Then the latex is converted to a solution of the polymer in heptane by repeating the conversion procedure described in Example 4.

EXAMPLE 7

A chloroprene/methylmethacrylate graft copolymer latex is converted to an organic liquid solution which is very useful in the formation of adhesive layers and coatings on a wide variety of substrates.

The latex is prepared by (1) dissolving in 1620 grams of water 42.0 grams of triethanolamine dodecylbenzenesulfonate (anionic surfactant) and 4.5 grams of sodium sulfite; (2) with the resulting solution in a nitrogen-blanketed polymerization flask as described in Example 1, adding with stirring a mixture of 1000 grams of chloroprene, 500 grams of methylmethacrylate and 5.5 grams of dodecylmercaptan, using vigorous stirring to form an emulsion of the monomers in water; (3) allowing the temperature of the emulsion to rise to 40° C. by the exothermic polymerization reaction that occurs; (4) keeping the emulsion at 40° C. while most of the heat of reaction is liberated; (5) gradually adding 19 ml. of a 2% aqueous solution of potassium persulfate (catalyst) at the rate of 1 ml. every 15 minutes while keeping the emulsion at 40° C. until the composition has a specific gravity of 1.091, the total polymerization time being about 5 hours.

The resulting latex has a solids content of about 42.3%. The dispersed polymer particles are composed of a graft copolymer of about 2 parts chloroprene for each part of methylmethacrylate; the copolymer contains grafted side chains of poly(methylmethacrylate).

The latex is converted first to a dispersion and then to a solution in an organic liquid by (a) making a transfer agent solution composed of 0.81 gram of 88% methyl trioctyl ammonium chloride dissolved in 98 ml. of hexane; (b) mixing 72 grams of the latex with 50 grams of water, and repeating Steps C, D, and E of Example 3 to perform the ion-exchange reaction and separation of layers; (c) converting the resulting dispersion of polymer particles in hexane to a solution by adding with stirring a blend of 98.0 ml. of acetone and 24.5 ml. of toluene until a 15% solids solution is obtained.

I claim:

1. A process for preparing a composition comprised of a mixture of a substantially water-insoluble polymer and an organic liquid which comprises
   (A) providing an aqueous dispersion of fine particles of said polymer containing an emulsifier which is an anionic surfactant,
   (B) providing a solution of a transfer agent in an organic liquid which is substantially immiscible with water, said transfer agent being a compound having the ability to undergo an ion-exchange reaction with said emulsifier as defined in C below, and said solution containing about 1–1.5 equivalents of transfer agent for each equivalent of emulsifier present in the aqueous dispersion; said transfer agent being a compound selected from the group: quaternary ammonium salts, and primary-, secondary- and tertiary amines, and said transfer agent having greater solubility in said organic liquid than in water, and having a water solubility of less than 1 gram per 100 grams of water at 22° C.,
   (C) causing the transfer agent solution provided in B to come in contact with the aqueous dispersion provided in A so that said transfer agent undergoes an ion-exchange reaction with said emulsifier and thereby forms a reaction product having solubility characteristics such that in a mixture of equal parts by weight of said organic liquid and water, about 90–100% by weight of the reaction product is dissolved in the organic liquid and about 0–10% by weight of it is dissolved in the water, and
   (D) causing substantially all the water to be removed from the composition.

2. A process according to claim 1 wherein the reaction product formed in C is a compound which lacks the ability to function as an emulsifier in the composition resulting from C.

3. A process according to claim 1 wherein the organic liquid used in B is a solvent for said polymer, and Step C results in a composition in which the polymer is in solution in the organic liquid.

4. A process according to claim 1 wherein the organic liquid used in B is a nonsolvent for at least a major portion of each particle of said polymer at temperatures at least as high as about 40° C., and Step C results in a composition in which fine particles of polymer are dispersed in the organic liquid.

5. A process according to claim 4 wherein said particles are composed of a polymer selected from the group consisting of block copolymers and graft copolymers, and about 5–49% by weight of each particle has at least some solubility in said organic liquid.

6. A process according to claim 4 wherein said organic liquid is a solvent for said polymer at a temperature between about 41° C. and a higher temperature that is not harmful to the components of the completed composition.

7. A process according to claim 5 wherein said polymer is a graft copolymer of chloroprene and 2-ethylhexylmethacrylate having a chloroprene content of about 51–95% by weight.

8. A process according to claim 7 wherein the transfer agent is methyltrioctyl ammonium chloride and the organic liquid is hexane.

9. A process according to claim 5 wherein said particles are composed of (a) substantially spherical monomolecular particles of a polymer which is rubbery at a temperature below 60° C. and has a molecular weight large enough to render the polymer substantially insoluble in the organic liquid, and (b) a polymer having at least some solubility in the organic liquid grafted onto component (a).

References Cited

UNITED STATES PATENTS

| | | | |
|---|---|---|---|
| 2,739,954 | 3/1956 | Fryling | 260—34.2 |
| 3,317,635 | 5/1967 | Osmond | 260—34.2 |
| 3,533,982 | 10/1970 | Schmidt et al. | 260—34.2 |
| 3,557,061 | 1/1971 | Hamann | 260—34.2 |
| 3,574,161 | 4/1971 | Campion et al. | 260—34.2 |

FOREIGN PATENTS

| | | | |
|---|---|---|---|
| 586,489 | 11/1959 | Canada | 260—34.2 |
| 1,018,376 | 1/1966 | Great Britain | 260—34.2 |

ALLAN LIEBERMAN, Primary Examiner

U.S. Cl. X.R.

260—33.6 UA, 34.2